(12) United States Patent
Saito

(10) Patent No.: US 6,658,247 B1
(45) Date of Patent: Dec. 2, 2003

(54) PORTABLE TELEPHONE TERMINAL APPARATUS FOR RECEIVING DATA AND DATA RECEIVING METHOD THEREWITH

(75) Inventor: Masatoshi Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/516,519

(22) Filed: Mar. 1, 2000

(30) Foreign Application Priority Data

Mar. 1, 1999 (JP) .......................................... 11-052594

(51) Int. Cl.[7] ............................................. H04M 11/10
(52) U.S. Cl. ...................... 455/412; 455/418; 455/422; 455/434; 455/515; 455/517; 455/553; 340/7.2; 340/7.24; 340/7.33; 340/7.34; 709/201; 709/203; 709/217; 709/219; 709/227
(58) Field of Search ................................ 455/553, 434, 455/515, 517, 3.01, 466, 412; 340/7.2, 7.24, 7.33, 7.34, 7.39, 7.41, 7.42; 709/201, 203, 217, 219, 227

(56) References Cited

U.S. PATENT DOCUMENTS

| 5,418,524 | A |   | 5/1995  | Fennell |
|-----------|---|---|---------|---------|
| 5,689,825 | A |   | 11/1997 | Averbuch et al. ............. 455/89 |
| 5,887,254 | A | * | 3/1999  | Halonen ..................... 455/419 |
| 5,909,437 | A | * | 6/1999  | Rhodes et al. ............... 370/349 |
| 6,009,325 | A | * | 12/1999 | Retzer et al. ................ 455/434 |
| 6,088,730 | A | * | 7/2000  | Kato et al. .................. 709/227 |
| 6,587,684 | B1| * | 7/2003  | Hsu et al. ................... 455/419 |

FOREIGN PATENT DOCUMENTS

| EP | 0804046 | 10/1997 | ............ H04Q/7/32 |
| EP | 0905991 | 3/1999  | ............ H04Q/7/32 |

OTHER PUBLICATIONS

Ericsson Inc., "Cellular Phone With Integrated MP3 Player", Research Disclosure, Kenneth Mason Publications, No. 418, Feb. 1999, p. 184.

* cited by examiner

Primary Examiner—William Trost
Assistant Examiner—Danh C Le
(74) Attorney, Agent, or Firm—Jay H. Maioli

(57) ABSTRACT

A data reception terminal apparatus and a data receiving method suitable for a music delivering system using a portable telephone terminal apparatus. When data is downloaded with a portable telephone terminal apparatus, received data is divided as blocks. Each block is received with a data reception channel. Whenever each block is received, a received call is detected with a received call detecting channel. Thus, while data is being downloaded, a received call can be detected. When the downloading operation of data is suspended, information that represents the next data position of data that has been downloaded is stored. When the downloading operation is resumed, the data is downloaded from the next data position of the data that has been downloaded and stored. Thus, the data downloading operation is resumed from the next data position of the data that has been downloaded. Consequently, the download time becomes short.

6 Claims, 7 Drawing Sheets

| Fig. 2A |
| Fig. 2B |

PORTABLE TELEPHONE TERMINAL APPARATUS FOR RECEIVING DATA AND DATA RECEIVING METHOD THEREWITH

BACKGROUND OF THE INVENTION

1. Field of the Invention

The present invention relates to a data receiving terminal apparatus and a data receiving method suitable for a music delivering system using a portable telephone terminal apparatus.

2. Description of the Related Art

Portable telephone terminal apparatuses have been widely used as terminal apparatuses for transmitting and receiving audio information services such as sports information, weather information, and traffic information as well as terminal apparatuses for communicating with remote parties. In other words, the portable telephone terminal apparatus are being mainly used as portable information terminal apparatuses in addition to the function of conventional telephone terminal apparatuses. As a service using such portable telephone terminal apparatuses, a music data delivering service has been studied.

In a music data delivering service using portable telephone terminal apparatuses, a server that stores many titles of music data that can be downloaded is used. When the user dials a predetermined telephone number with his/her telephone terminal apparatus, it can be connected to the server of the music data delivering service. Thereafter, when the user selects a desired music title, it can be downloaded to the portable telephone terminal apparatus.

In the music data delivering service using such a portable telephone terminal apparatus, the user can easily download his/her desired music title. In addition, when the portable terminal apparatus has a music reproducing circuit as a headset system, the user can enjoy the downloaded music title at any place and any time.

However, when the music title delivering service is used with the portable telephone terminal, while music data is being downloaded, the portable telephone terminal apparatus cannot receive a call.

In addition, while music data is being received, the reception state may deteriorate due to an influence of a building or the like. When a call is received, the data downloading operation should be suspended. In such a state, after the data receiving state improves or a telephone communication is completed, the data downloading operation should be resumed.

However, conventionally, when the data downloading operation is resumed, the data position of data that has been downloaded is unknown. Thus, the music data should be downloaded from the beginning. Consequently, it takes a long time to download the music data.

OBJECTS AND SUMMARY OF THE INVENTION

An object of the present invention is to provide a data receiving terminal apparatus and a data receiving method that allow a call to be received while data is being downloaded.

Another object of the present invention is to provide a data receiving terminal apparatus and a data receiving method that allow the downloading operation of data to be resumed in a short time.

An aspect of the present invention is a portable radio telephone terminal apparatus for receiving data transmitted as blocks, comprising a means for switching a data reception channel into a received call detecting channel, a data receiving means for receiving the blocks of the received data with the receiving channel in such a manner one of the blocks is received at a time, and a received call detecting means for receiving a call with the received call detecting channel whenever each block is received.

Thus, while data is being downloaded, a received call can be detected.

The portable radio telephone terminal apparatus may further comprises a means for suspending the reception of data when a received call is detected and storing information that represents the next data position of the data that has been received.

The portable radio telephone terminal apparatus may further comprise a means for receiving data from the next data position of the data that has been received and stored when the data reception is resumed.

Thus, the downloading operation is resumed from the next data position of data that has been downloaded. Consequently, the download time becomes short.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
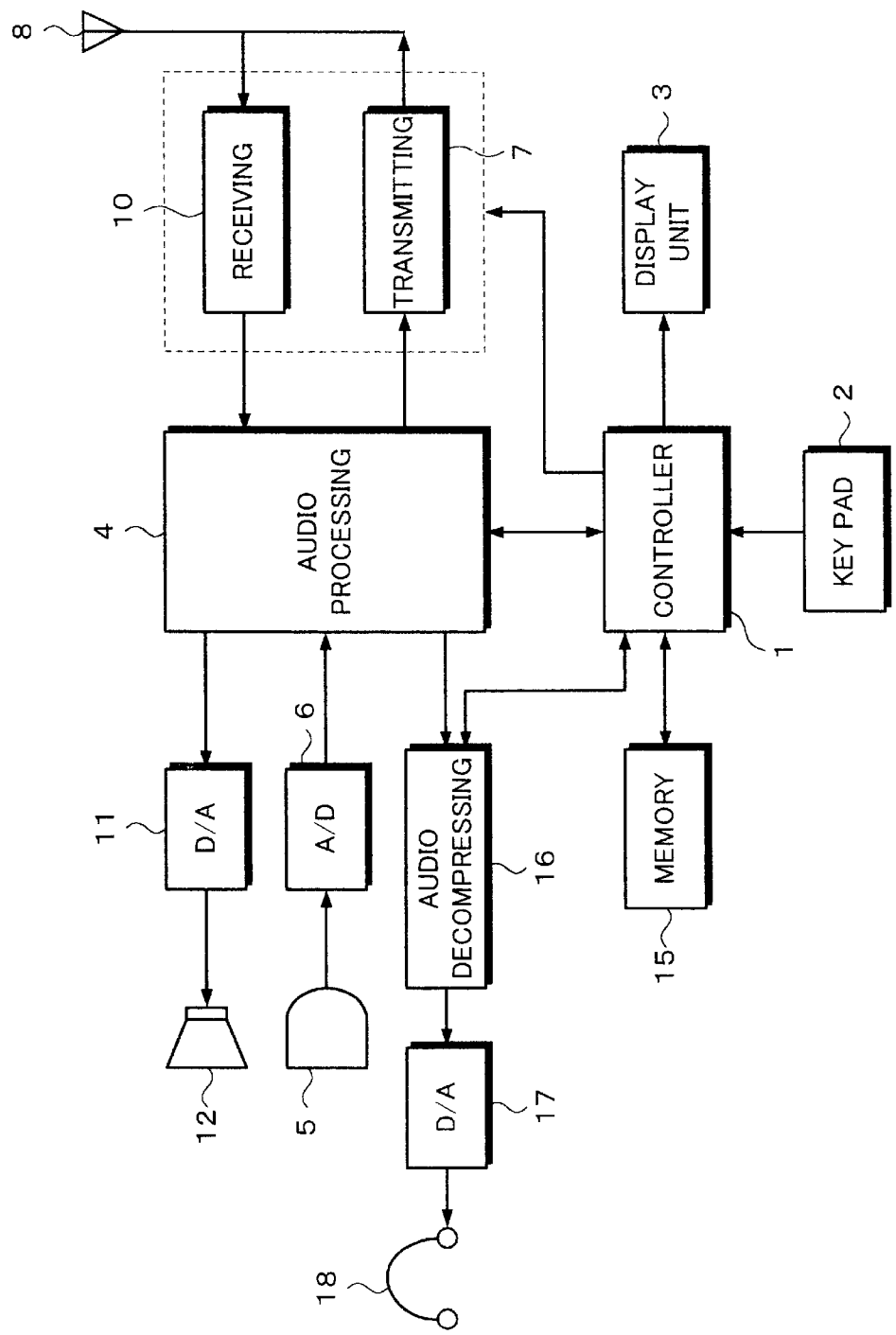
FIG. 1 is a block diagram showing an example of the structure of a portable telephone terminal apparatus according to the present invention.

FIG. 1 is a block diagram showing an example of the structure of a portale telephone terminal apparatus according to the present invention. In FIG. 1, reference numeral 1 is a controller. Key data is input to the controller 1 from a key pad 2. The key pad 2 is disposed on a front panel of the portable telephone terminal apparatus. With the key pad 2, the user can set a telephone number, a call transmission, a call reception, and so forth. When the user uses a music data delivering service, he or she can set a menu and download a music title with the key pad 2.

Output data of the controller 1 is supplied to a display unit 3. The display unit 3 displays a telephone number, and so forth. When the user uses the music data delivering service, a menu and a music title list are displayed.

In FIG. 1, reference numeral 4 is an audio processing circuit. When the user transmits a call to a remote party, the audio processing circuit 4 performs an encoding process for a digital audio signal. When the user receives a call from a remote party, the audio processing circuit 4 performs a decoding process for a digital audio signal. In PDC (Personal Digital Cellular) system used in Japan, VSELP (Vector Sum Excited Linear Predictive Coding) system is used as the audio encoding system. It should be noted that the present invention is not limited to such a system.

When the user transmits a call to a remote party, his/her voice is input from a microphone 5. Output data of the microphone 5 is supplied to an A/D converter 6. The A/D converter 6 digitizes the output data of the microphone 5. The digital data is supplied to the audio processing circuit 4. The audio processing circuit 4 encodes the digital data corresponding to for example VSELP. Output data of the audio processing circuit 4 is supplied to a transmitting circuit 7. The transmitting circuit 7 modulates transmission data with a carrier as a predetermined frequency signal. An output signal of the transmitting circuit 7 is supplied to an antenna 8. The transmission signal is transmitted from the antenna 8 to a base station.

When a call is received, a received signal is supplied from the antenna 8 to a receiving circuit 10. The receiving circuit 10 demodulates the received signal. The demodulated signal is supplied to the audio processing circuit 4. The audio processing circuit 4 decodes the demodulated signal corresponding to for example the VSELP decoding process and obtains a digital audio signal.

The decoded digital audio signal is supplied to a D/A converter 11. The D/A converter 11 converts the digital audio signal into an analog signal. The audio signal is supplied to a speaker 12.

In the above-described example, the present invention is applied to a TDMA (Time Division Multiple Access) type portable telephone terminal apparatus. Alternatively, the present invention can be applied to another type portale telephone terminal apparatus such. as CDMA (Code Division Multiple Access) type portable telephone terminal apparatus.

With the portable telephone terminal apparatus according to the present invention, using the music data delivering service, music data can be downloaded. When the music data delivering service is used, with the operation of the key pad 2, the portable telephone terminal apparatus is connected to a server of the music data delivering service. After the portable telephone terminal apparatus is connected to the server of the music data delivering service, when the user selects his/her desired music title, the server transmits music data of the selected music title to the portable telephone terminal apparatus. The music data received by the portable telephone terminal apparatus is supplied from the receiving circuit 10 to a memory 15 through the audio processing circuit 4 and a controller 1. The memory 15 stores the received music data.

Since the data amount of the music data is very large, before it is transmitted, it is compressed. As an example of the compressing method, ATRAC (Adaptive Transform Acoustic Coding) method may be used. However, it should be noted that the present invention is not limited to such a method. In other words, another compressing method can be used.

As an example of the memory 15, a non-volatile flash memory can be used. The memory 15 may be built in the portable telephone terminal apparatus. As another example of the memory 15, a card type memory may be used so that it is detachable from the portable telephone terminal apparatus. Of course, as the memory 15, a magnetic disk or an optical disc may be used.

When music data stored in the memory 15 is reproduced, with the operation of the key pad 2, a desired music title is selected from those stored in the memory 15. When a desired music title is selected, the selected music title is read from the memory 15 and supplied to an audio decompressing circuit 16. The audio decompressing circuit 16 decompresses audio data that has been compressed corresponding to ATRAC method and obtains a digital audio signal.

Output data of the audio decompressing circuit 16 is supplied to a D/A converter 17. The D/A converter 17 converts the digital audio signal into an analog audio signal. An output signal of the D/A converter 17 is supplied to a headset 18.

In the above-described example, both the speaker 12 used for transmitting and receiving a call and the headset 18 use for outputting reproduced audio data from the memory 15 are used. Alternatively, the speaker 12 and the headset 18 may be used in common.

With the portable telephone terminal apparatus having the memory 15 that stores music data, when the user uses the music data delivering service, he or she can easily select a desired music title, download it, and reproduce it with the headset 18.

Figures 2, 2A:
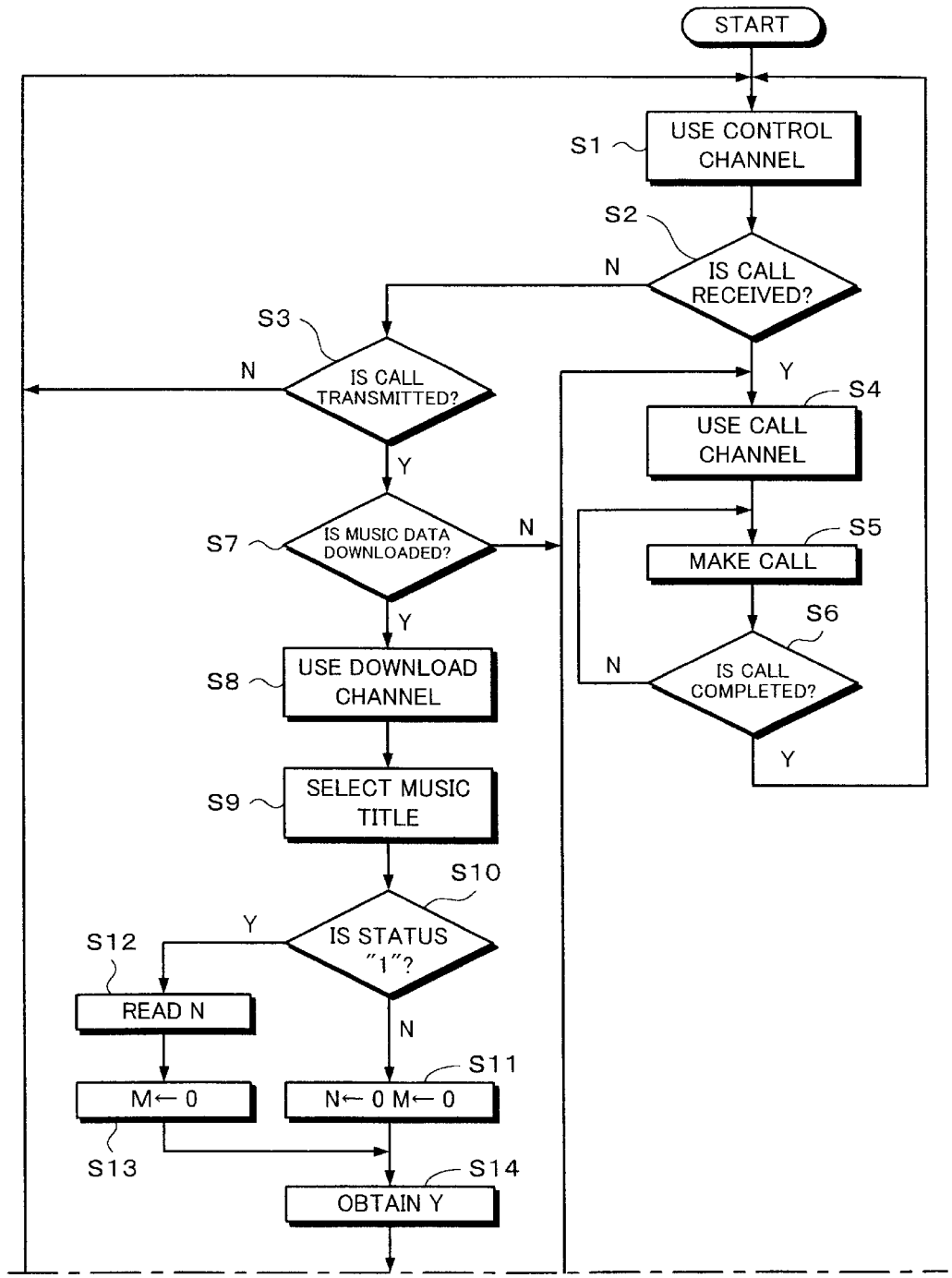
FIGS. 2A and 2B are flow charts for explaining an example of the process of the portable telephone terminal apparatus according to the present invention.
Figure 2B:
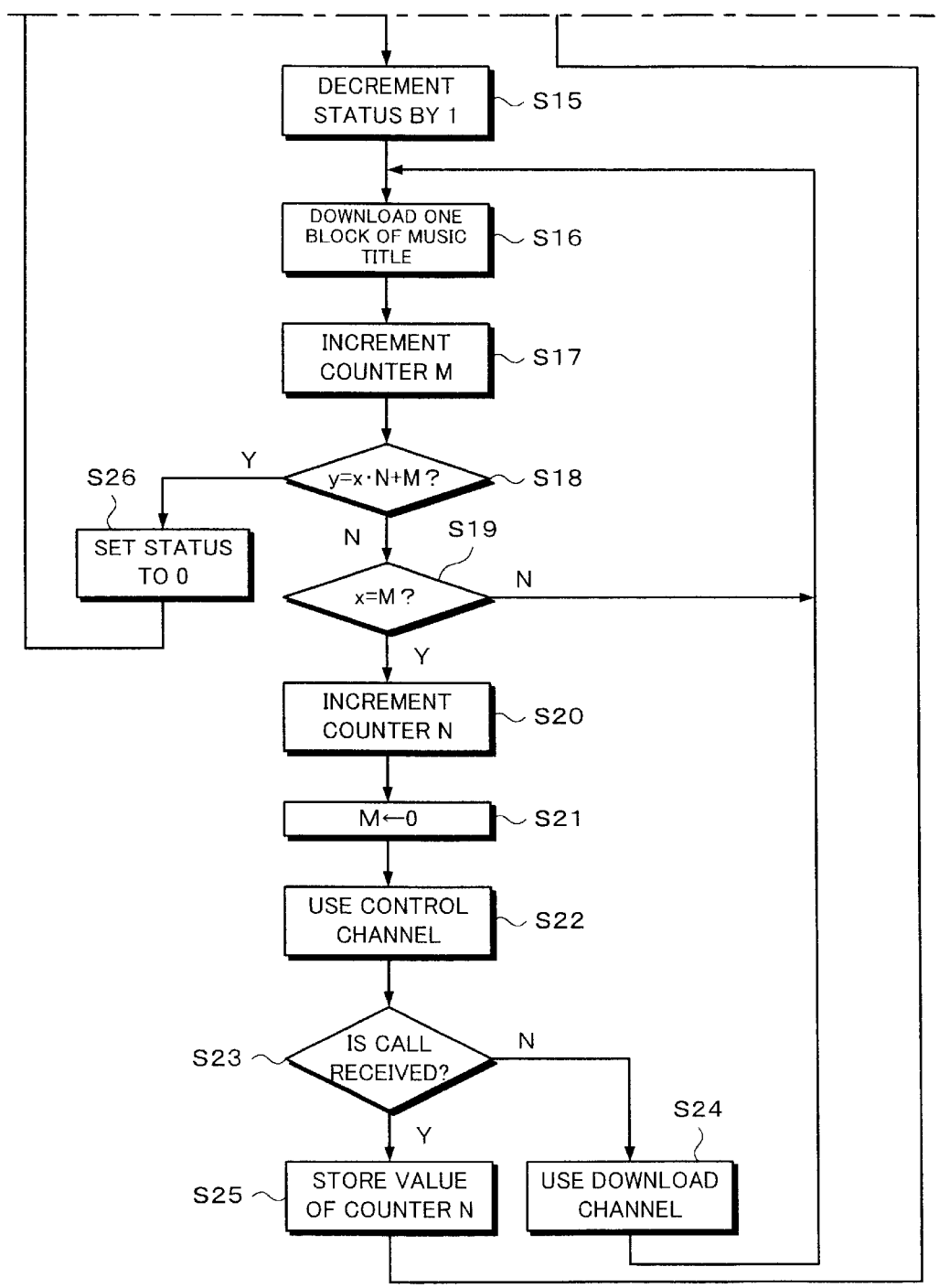

FIG. 2 is a flow chart showing a call process of the telephone terminal apparatus according to the present invention. In FIG. 2, in a standby state, a control channel is used (at step S1). It is determined whether or not a call is received (at step S2). When the determined result at step S2 is No, it is determined whether or not a call is transmitted (at step S3). When the determined result at step S3 is No, the flow returns to step S1. Thus, a loop of steps S1 to S3 is repeated. When the determined result at step S2 is Yes, a speech channel is used (at step S4). A call is made (at step S5). After the call is completed (at step S6), the flow returns to step S1. Thus, the loop of steps S1 to S3 is repeated. When the determined result at step S3 is Yes, it is determined whether or not the call is a call for downloading music data (at step S7). When the determined result at step S7 is No, a call channel is used (at step S4). A call is made (at step S5). After the call is completed (at step S6), the flow returns to step S1. Thus, the loop of steps S1 to S3 is repeated.

When the determined result at step S7 is Yes, a download channel is used (at step S8). Thereafter, a desired music title to be downloaded is selected (at step S9). Thereafter, it is determined whether or not the status is "1" (at step S10). The status represents whether or not the music title has been partly downloaded. When the status is "1", it represents that the music title has been partly downloaded. In contrast, when the status is "0", it represents that the music title has not been partly downloaded.

At step S10, when the status is "0", the value of a load counter N is initialized to "0". In addition, the value of a bit counter M is initialized to "0" (at step S11). The load counter represents the number of blocks of the received music data. The bit counter represents the amount of data of one block of the received music data. When the status is "1" at step S10, the value of the load counter N remains unchanged (at step S12). In this case, the value of the bit counter M is initialized to "0" (at step S13). Thereafter, the total data amount y of the received music data is obtained (at step S14). Thereafter, the status is set to "1" and then the music data is downloaded (at step S16). At this point, the download start position of the music data is set corresponding to the value of the load counter N and the value of the bit counter M. In other words, when the determined result at step S10 is No, since the value of the load counter N and the value of the bit counter M have been initialized to "0", the start position of the music data becomes the download start position. When the determined result at step S10 is Yes, the value of the load counter N remains unchanged. Since the value of the bit counter M is set to "0" at step S13, the beginning of the stored block becomes the download start position.

When the music data is downloaded, the value of the bit counter M increments corresponding to the data amount of the downloaded music data (at step S17). Thereafter, it is determined whether or not the total data amount of the downloaded music data becomes the total data amount y of the received music data. In other words, the data amount of downloaded music data is obtained as (x×N+M) where M is the value of the bit counter, N is the value of the load counter, and x is the data amount of music data of one block. It is determined whether or not the value of (x×N+M) is equal to the total data amount y of the music data (at step S18). When the determined result at step S18 is No, it is determined whether or not the value of the bit counter M is equal to the data amount x of the music data of one block (at step S19). When the determined result at step S19 is No, the flow returns to step S16. At step S16, the downloading operation of the music data is continued.

When the music data is successively downloaded, the value of the bit counter M becomes equal to the data amount x of one block of the music data. When the determined result at step S19 is Yes, the value of the load counter N increments (at step S20). The value of the bit counter M is set to "0" (at step S21). Thereafter, the download channel is switched to the control channel (at step S22).

Thereafter, it is determined whether or not a call is received (at step S23). When the determined result at step S23 is No, the control channel is switched to the download channel (at step S24). Thereafter, the flow returns to step S16. At step S16, corresponding to the value of the load counter N, the download start position of the music data is set. Thereafter, the music data is downloaded. Whenever the data amount x of one block of the music data is received, the value of the load counter N increments at step S20. Thus, whenever data of one block is received, the download start position of the music data advances by one block. Consequently, the music data is divided into blocks and each block is received at a time.

A loop of steps S16 to S24 is repeated. Each block of the music data is downloaded at a time. After each block is received, the download channel is switched to the control channel is used and a received call is detected with the control channel. When the determined result at step S23 is Yes, the value of the load counter N remains unchanged (at step S25). The value of the load counter N is stored in a memory or a register of the controller 1. Thereafter, the control channel is switched to the call channel (at step S4) and then a call is made (at step S5). Thereafter, the flow returns to step S1. After the call is completed (at step S6)., the flow returns to step S1. Thus, the loop of steps S1 to S3 is repeated.

Thereafter, the loop of step S16 to step S24 is repeated. The music data is successively downloaded. After the music data is downloaded, it is determined whether or not the value of (x×N+M) is equal to the total data amount y of the music data at step S18. In this case, the status is "0" (at step S26). Thereafter, the flow returns to step S1. Thus, the loop of steps S1 to S3 is repeated.

As described above, the portable telephone terminal apparatus according to the present invention receives blocks of music data, switches the download channel into the control channel upon completion of the reception of each block, and detects a received call. Thus, while music data is being downloaded, a received call can be detected.

Figure 3:
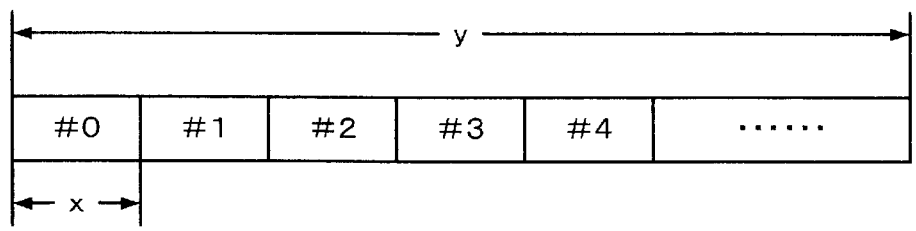
FIG. 3 is a schematic diagram for explaining an example of music data that is downloaded.

In the portable telephone terminal apparatus according to the present invention, when a call is received while data is being downloaded, the value of the load counter N is stored at step S25. Thus, when the next music data is downloaded, the value of the load counter N is set at step S12. Corresponding to the value of the load counter N, the downloading operation is resumed. Consequently, the downloading operation is resumed from the next position of the downloaded music data. In other words, as shown in FIG. 3, when the total data amount of the received music data is y, it is divided into blocks each of which is composed of x bits. The blocks are received one after the other as with blocks #0, #1, #2, . . . .

Figure 4:
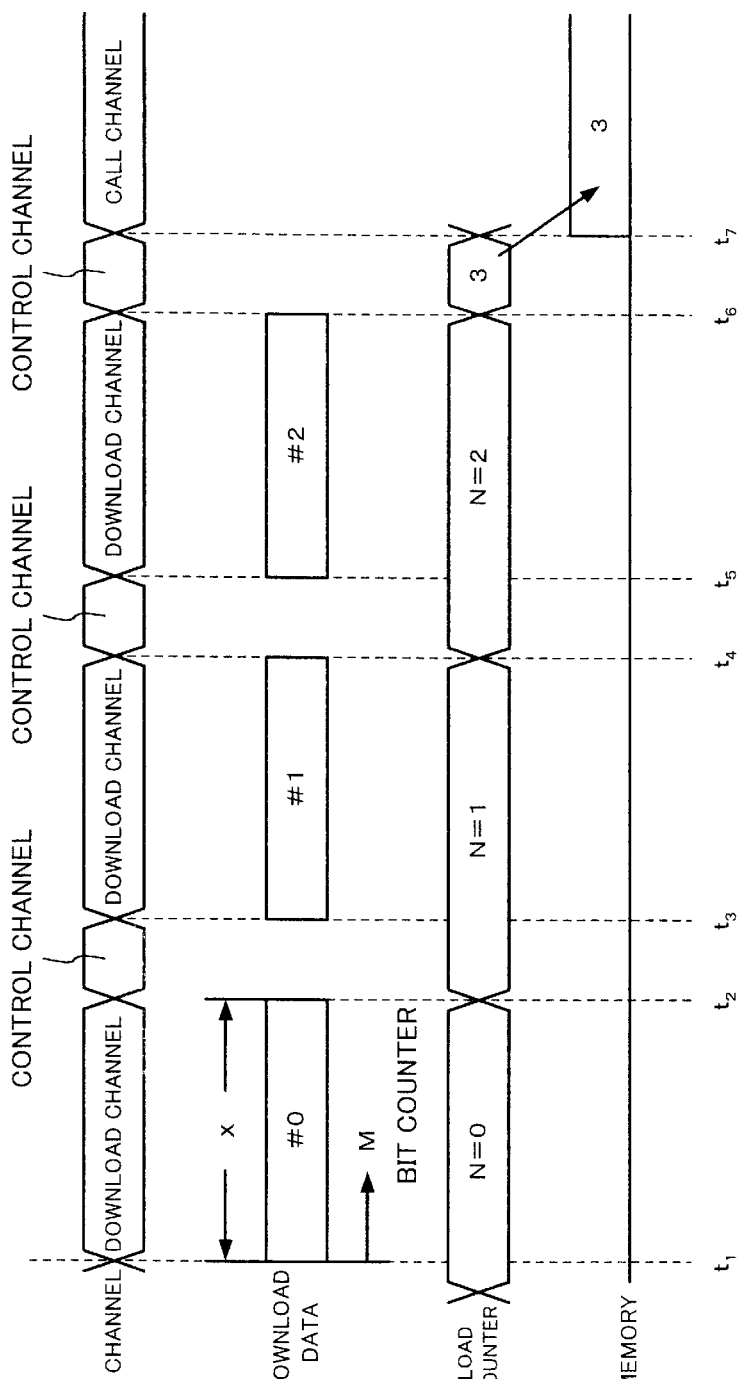
FIGS. 4A, 4B, 4C, and 4D are timing charts for explaining an example of the process of the portable telephone terminal apparatus according to the present invention.

When a new music title is downloaded, as shown in FIG. 4A, the download channel is used. The value of the load counter N and the value of the bit counter M are initialized to "0". Thus, the downloading operation of the music data starts. Since the value of the load counter N and the value of the bit counter M are initialized to "0", as shown in FIG. 4B, a block #0 is downloaded at time t1. At this point, the data amount of one block that has been downloaded is represented with the value of the bit counter M.

When one block of the music data has been received at time t2, the value of the bit counter M becomes x. When the value of the bit counter M becomes x, as shown in FIG. 4A, the download channel is switched to the control channel. As shown in FIG. 4C, the value of the load counter N becomes "1". When a call is not received with the control channel, at time t3, corresponding to the value of the load counter N and the value of the bit counter M, the next block of the music data is downloaded. At this point, since the value of the load counter N is "1" and the value of the bit counter M is "0", as shown in FIG. 4B, block #1 is downloaded from the beginning.

Likewise, when one block of music data is received at time t3 to t4, the value of the bit counter m becomes x. At time t4, the download channel is switched to the control channel. Thereafter, the value of the load counter N becomes "2". When a call is not received, corresponding to the value of the load counter N and the value of the bit counter M, as shown in FIG. 4B, the block #2 is downloaded from the beginning at time t5.

When one block is received at time t6 and the value of the bit counter M becomes x, as shown in FIG. 4A, the download channel is switched to the control channel. Thus, the value of the load counter becomes "3". When a call is received, as shown in FIG. 4D, the value "3" of the load counter is stored. As shown in FIG. 4A, the control channel is switched to the call channel. Thus, while music data is being downloaded, the download channel is switched to the control channel whenever each block is downloaded. Thus, a received call can be detected. When a call is received, the download channel is switched to the call channel. Thus, a call is made.

Figure 5:
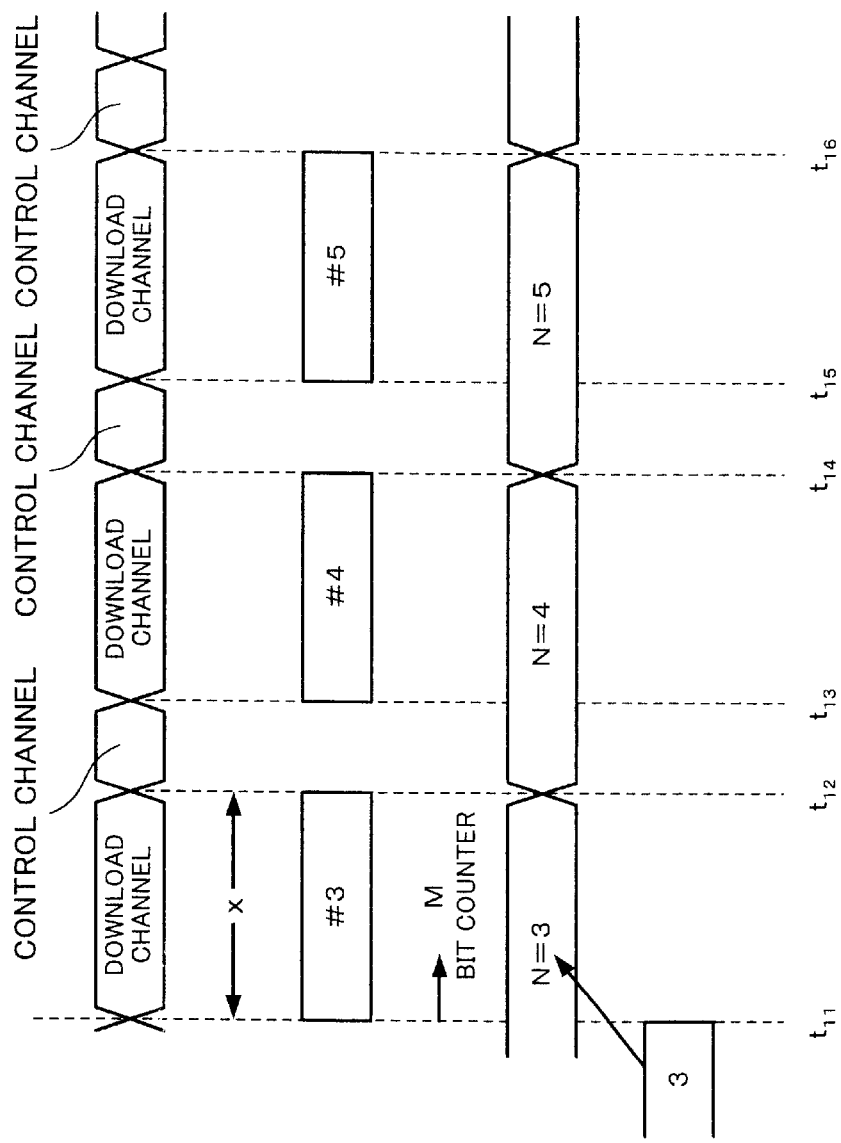
FIGS. 5A, 5B, 5C, and 5D are timing charts for explaining an example of the process of the portable telephone terminal apparatus according to the present invention.

After the call is completed, when the downloading operation of the music data is resumed, the stored value of the load counter is read. At this point, as shown in FIG. 4D, the value "3" is stored as the value of the load counter M. When the downloading operation of the music data is resumed, since the value of the load counter N is "3", the block #3 is downloaded. FIGS. 5A, 5B, 5C, and 5D show the case of which the downloading operation of music data is resumed. When the downloading operation of music data is resumed, as shown in FIG. 5A, the control channel is switched to the download channel. As shown in FIG. 5C, the value of the load counter N is set to "3". The value of the bit counter M is set to "0". Thus, the downloading operation of the music data starts. Since the value of the load counter N is set to "3" and the value of the bit counter M is set to "0", as shown in FIG. 5B, the block #3 is downloaded from the beginning at time t11.

Thereafter, when one block of the music data is received at time t11 to t12, the value of the bit counter M becomes x. At time t12, the download channel is switched to the control channel. The value of the load counter becomes "4". When a call is not received, corresponding to the value of the load counter N and the value of the bit counter m, as shown in FIG. 5B, the block #4 is downloaded from the beginning at time t13. Likewise, the music data is successively downloaded. When the downloading operation of the music data is suspended, the value of the load counter N is stored. Thus, when the downloading operation of the music data is resumed, the music data is downloaded from the next block thereof. Thus, the downloading operation can be performed without a loss.

Figure 6:
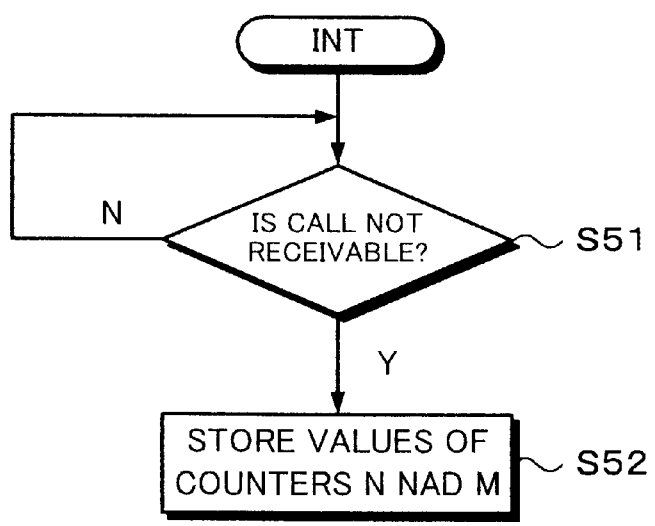
FIG. 6 is a flow chart for explaining another example of the process of the portable telephone terminal apparatus according to the present invention.

The downloading operation may be suspended when the portable telephone terminal apparatus is used in a place where a radio wave cannot be properly received as well as the case that it receives a call. Thus, as shown in FIG. 6, the portable telephone terminal apparatus always determines whether or not a call can be received while music data is being downloaded (at step S51). When the determined result at step S51 is Yes, an interrupt process is performed. In this case, the value of the load counter N and the value of the bit counter M are stored (at step S52). Thus, when the downloading operation for the music data is resumed, the music data can be downloaded from the next data block thereof.

In the above-described example, music data is received as blocks each of which is composed of a predetermined amount of data. The download channel is switched to the control channel whenever each block is downloaded. However, it should be noted that the size of each block may not be fixed, but variable. In addition, one block may be a predetermined time period rather than a predetermined data amount. In the above-described example, the downloading operation of music data was described. Of course, the present invention can be applied to the case that data other than music data is downloaded.

As described above, according to the present invention, when data is downloaded with a portable telephone terminal apparatus, received data is divided into blocks. Each block is received with a download channel. The download channel is switched to a call channel whenever each block is downloaded. Thus, while music data is being downloaded, a received call can be detected. When the downloading operation is suspended due to a received call, information that represents the data position of the music data that has been downloaded is stored. When the downloading operation is resumed, the music data can be received from the next data position of the data that has been downloaded. Thus, music data is downloaded from the next data position of the data that has been downloaded. Consequently, the download time becomes short.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A portable radio telephone terminal apparatus for receiving data transmitted as blocks of a predetermined size, comprising:

monitoring means for monitoring whether a call is received using a control channel;

call receiving means for receiving the call using a call channel;

data receiving means for receiving the blocks of data using a download channel, wherein the blocks are received one at a time; and control means for switching between the call channel and the download channel when the call is completed, for obtaining a total number of blocks of data to be received, and for tracking a number of blocks of received data, wherein when the call is completed and the call channel is switched to the download channel the control means determines whether a download has started by checking whether any of the blocks of data has been received, and when the control means determines that the download has started a next block of data is downloaded and the control channel is monitored by the monitor means to determine whether the call is received, and when the call is not received a further block of data is downloaded and the download channel is switched to the control channel, this step being repeated until the total number of blocks of data is received.

2. The portable radio telephone terminal apparatus as set forth in claim 1, further comprising:

means for suspending the reception of data when the call is received and storing information representing a following block of data to be received.

3. The portable radio telephone terminal apparatus as set forth in claim 2, further comprising:

means for receiving the following block of data when the reception of data is resumed.

4. A method for receiving data that has been divided into a plurality of blocks of data of a predetermined size with a portable radio telephone terminal apparatus, comprising the steps of:

monitoring whether a call is received using a control channel;

receiving the call using a call channel;

receiving the blocks of data using a download channel, wherein the blocks are received one at a time; and controlling a switching between the call channel and the download channel when the call is completed, obtaining a total number of blocks of data to be received, and tracking a number of blocks of received data, wherein when the call is completed and the call channel is switched to the download channel determining whether a download has started by checking whether any of the blocks of data has been received, and when the download has started a next block of data is downloaded and the control channel is monitored to determine whether the call is received, and when the call is not received a further block of data is downloaded and the download channel is switched to the control channel, this step being repeated until the total number of blocks of data is received.

5. The data receiving method as set forth in claim 4, further comprising the step of:

suspending the reception of data when the call is received and storing information representing a following block of data to be received.

6. The data receiving method as set forth in claim 5, further comprising the step of:

receiving the following block of data when the reception of data is resumed.

* * * * *